J. SMOLINSKI.
Cooking Stove.
No. 8,974.
4 Sheets—Sheet 1.
Patented May 25, 1852.
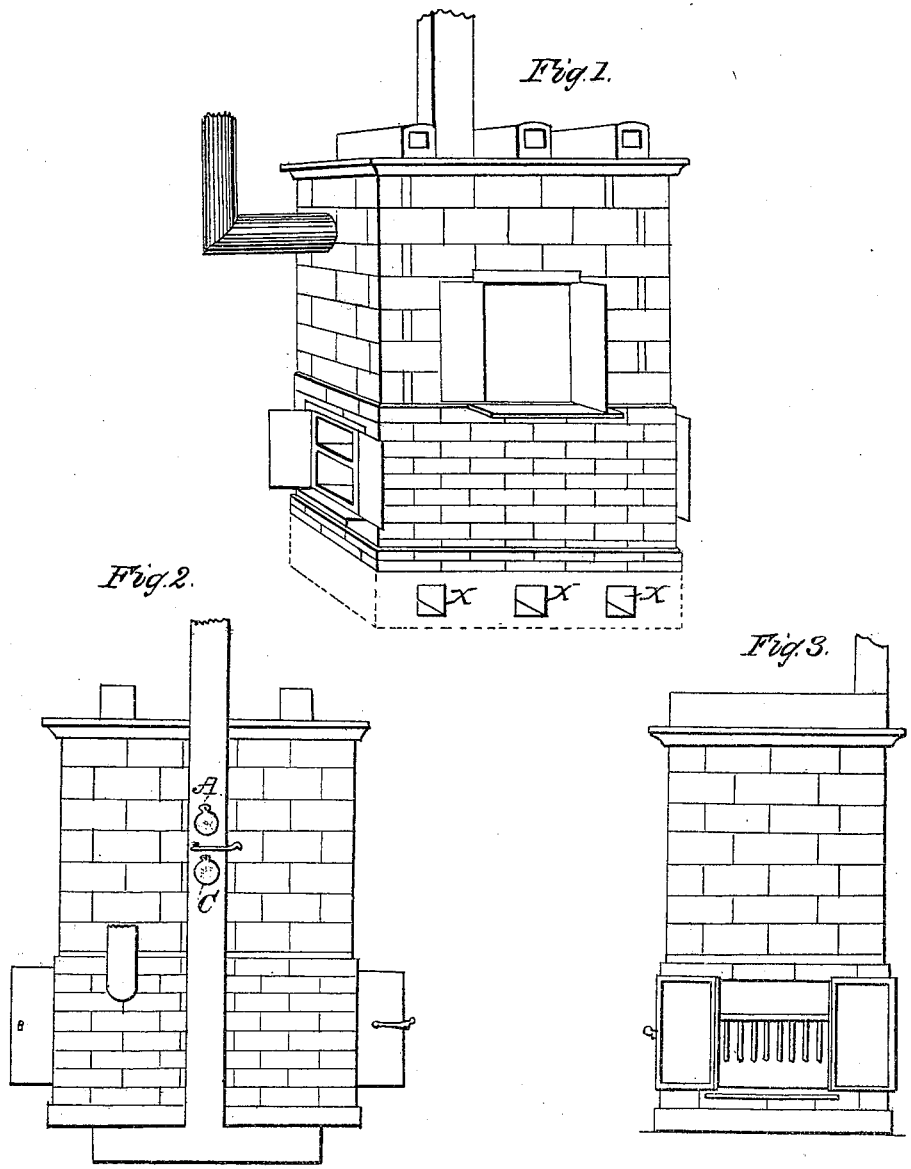

J. SMOLINSKI.
Cooking Stove.
No. 8,974.
4 Sheets—Sheet 2.
Patented May 25, 1852.
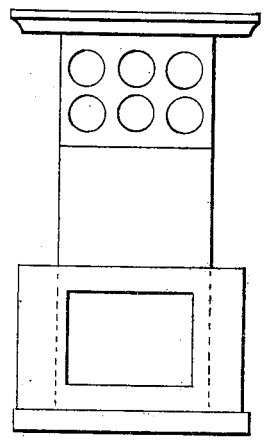
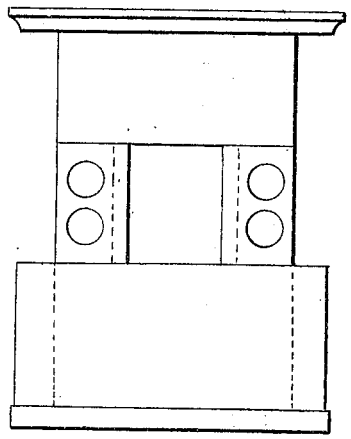
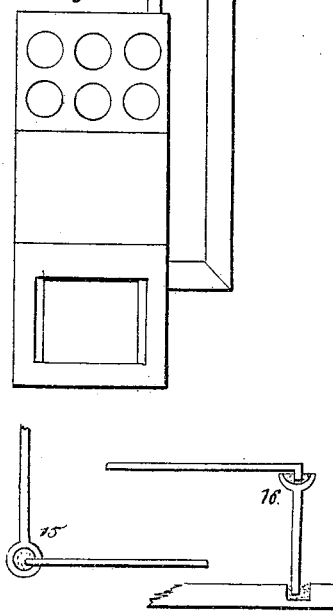
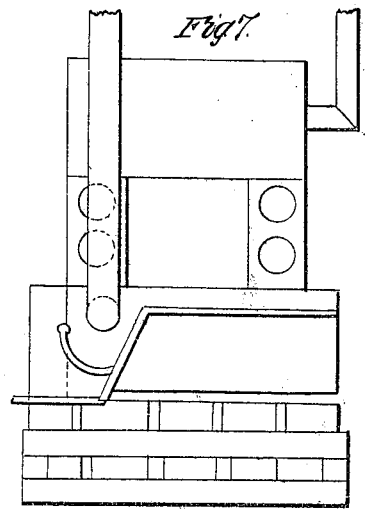

J. SMOLINSKI.
Cooking Stove.

No. 8,974.

4 Sheets—Sheet 3.

Patented May 25, 1852.

Cross Section above fire grate

Vertical Section. Smoke flues

J. SMOLINSKI.

Cooking Stove.

No. 8,974.

4 Sheets—Sheet 4.

Patented May 25, 1852.

UNITED STATES PATENT OFFICE.

JOSEPH SMOLINSKI, OF NEW YORK, N. Y.

COOKING APPARATUS.

Specification of Letters Patent No. 8,974, dated May 25, 1852.

*To all whom it may concern:*

Be it known that I, JOSEPH SMOLINSKI, of New York, county and State of New York, have invented a new and Improved Construction of Heating, Cooking, and Ventilating Apparatus; and I hereby declare that the following is a full and exact description.

To enable others to make and use my invention I proceed to describe its construction and operation, reference being had to the annexed drawings which make part of this specification.

Figure 8:
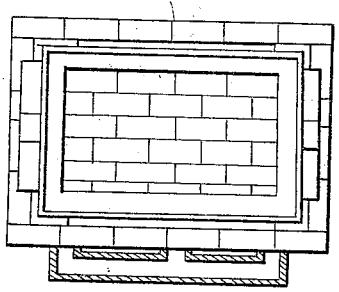
Figure 9:
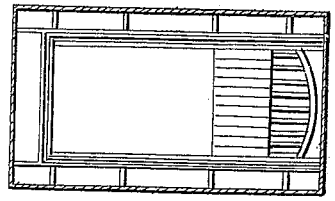
Figure 10:
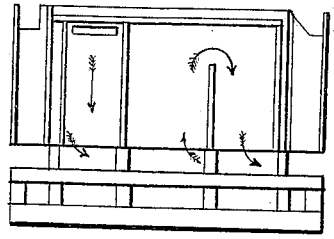
Figure 11:
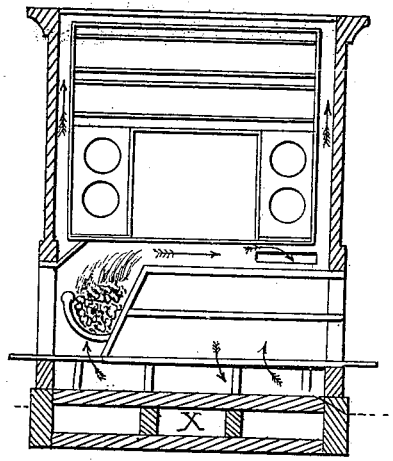
Figure 12:
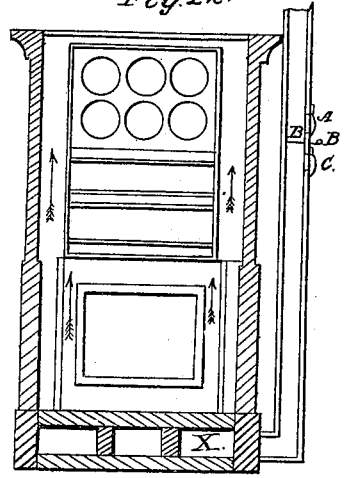
Figure 13:
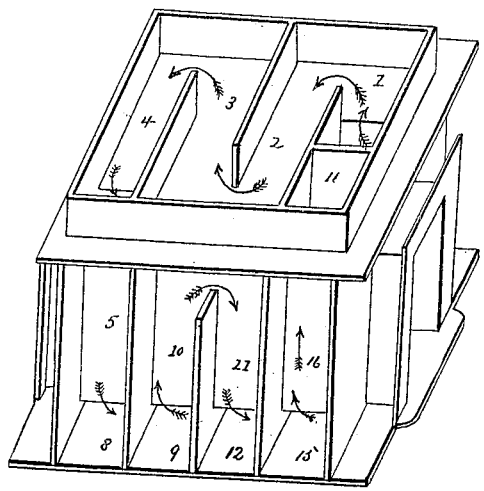
Figure 14:
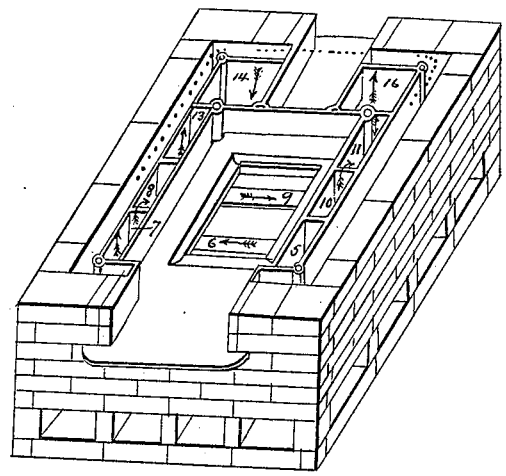

Figure 1 perspective view of the apparatus entire. Fig. 2 rear elevation. Fig. 3 one of the sides. Figs. 4, 5, 6 and 7 diagrams showing the form of the boiler. Fig. 8 plan and foundation plate. Fig. 9 plan above the baking oven. Fig. 10 vertical section showing the side smoke flue. Fig. 11 section showing the grate—ovens and boiler. Fig. 12 section—vertical in the other direction. Fig. 13 perspective—showing the smoke flues. Fig. 14 transverse section of the above—both being a variation of the shape of the apparatus. Figs. 15 and 16 Plate III, the sand channels.

The peculiarities of my stove adapt it to permanent Russian stoves, to cooking stoves, to hot air furnaces, to common grates, or to nearly all these combined, and all or any of them having a good apparatus for ventilation.

The points in which I claim to have made improvements are: the enveloping the center of the stove or furnace (as for instance the oven, or place for cooking) with the smoke flues, carrying them up and down upon each side and above and beneath so that all the caloric in the smoke may be absorbed before it passes out at the chimney. And second by the combining with the stove an easy and efficient mode of ventilation.

The flues for the smoke are numbered in the diagrams (see Plate II, Fig. 13) at each turn. The course of the smoke will be seen by the arrows.

The smoke from the grate rises to the center opening over it. Flue No. 1 is first over the grate. Nos. 2, 3 and 4 are horizontal, lying along under the cooking oven and boiler at No. 5, (same diagram) it turns down the side of the baking oven, and under it at 6 (Fig. 14), then at 7 it rises on the other side of the oven, then at 8 turns down the same side and under the oven at 9. Then up (10) the side of the oven (see 13 and 14 Figs.) and down (11) and again under the oven (12) then up on the other side (13), then down (14) back under the oven (15) up (16) to the chimney.

The fresh air enters the ventilator pipe see Figs. 2 and 12 at the top of the house and descends (the key or cut off B being turned) to the bottom of the machine (see Figs. 1, 11 and 12) at X, and then encircles and permeates the whole, between the brick work of the outside and the smoke flues—and through the tubular boiler.

All the joints and pieces forming smoke flues are connected by dry sand as shown in the drawings 15 and 16 Plate III, so that they will not leak in case of expansion or contraction or warping of the plates.

At the corners of the vertical joints are made cylindrical or square cavities, and filled with dry sand, into which the edge of the connecting piece is inserted. Where the joints are horizontal a channel is filled with sand and the piece set into it.

For the sand channels of the top joints horizontal) they are made in the plates—see Fig. 16.

The edge of the plate should be buried half an inch deep in the sand. With these arrangements every smoke flue is inclosed safely so that the smoke and gas cannot possibly leak into the hot air flues.

My system of ventilation is peculiar in some respects. It is sometimes desirable to furnish fresh air (to be heated) from the rooms in the house, where the air may be pure and not so cold as from out doors, instead of the usual way. For this purpose I provide registers or cut offs for each room. See Fig. 2 A, B, C.

If the air be required from out doors for the heating apparatus, the key or cut off B, is opened and both valves A and C closed.

If from the room the air is to be taken, the cut off, B, is closed and the valve, C, is opened. If cold air be required in the room from out doors the cut off B, is closed and the valve A, is opened. Thus by the use of the key B, and the valves C, and A, for each room, connected with the apparatus, I bring in cold air from the top of the house either into the room or to supply the heater—or by shutting the key, B, and opening, C, the air of the room is conveyed to the heater to be heated over again.

I bring the hot air into each room by separate crockery tubes or conductors set in the walls.

What I claim as my invention and desire to secure by Letters Patent is:

1. The peculiar arrangement of the smoke flues, as shown Figs. 13 and 14, by which they are made to envelop the center on all sides and thus concentrate them in the smallest possible space.

2. The combination with this machine of the key and valves A, B, C, for ventilation and supply of air to the furnace from the room as above described.

J. SMOLINSKI.

Witnesses:
OWEN G. WARREN,
DANIEL W. CLARKE.